(12) United States Patent
Witek et al.

(10) Patent No.: US 10,691,490 B2
(45) Date of Patent: Jun. 23, 2020

(54) SYSTEM FOR SCHEDULING THREADS FOR EXECUTION

(71) Applicant: Apple Inc., Cupertino, CA (US)

(72) Inventors: Richard T. Witek, Redmond, WA (US); Peter C. Eastty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/029,155

(22) Filed: Jul. 6, 2018

(65) Prior Publication Data
US 2020/0012518 A1    Jan. 9, 2020

(51) Int. Cl.
*G06F 9/46* (2006.01)
*G06F 9/48* (2006.01)

(52) U.S. Cl.
CPC .......... *G06F 9/4881* (2013.01); *G06F 9/4818* (2013.01)

(58) Field of Classification Search
None
See application file for complete search history.

(56) References Cited

U.S. PATENT DOCUMENTS

| 5,968,167 | A | 10/1999 | Whittaker et al. |
| 7,802,255 | B2 | 9/2010 | Pilkington |
| 8,898,434 | B2 | 11/2014 | Merchant et al. |
| 9,183,047 | B2 | 11/2015 | Lim et al. |
| 9,778,949 | B2 | 10/2017 | Serebrin |
| 2008/0046893 | A1 | 2/2008 | Taylor et al. |

OTHER PUBLICATIONS

Ghiath Al-Kadi, et al., "A Hardware Task Scheduler for Embedded Video Processing," NXP Semiconductors, Springer-Verlag Berlin Heidelberg 2009, 13 pages.
International Search Report and Written Opinion in Appl. No. PCT/US2019/040711 dated Oct. 1, 2019, 15 pages.
K.K. Ramakrishnan, et al., "Operating System for a Video-On-Demand File Service," Proceedings of the International Workshop on Network and Operating System Support for Digital Audio and Video (NOSSDAV), Nov. 3, 1993, pp. 216-227.

*Primary Examiner* — Gregory A Kessler
(74) *Attorney, Agent, or Firm* — Kowert, Hood, Munyon, Rankin & Goetzel, P.C.

(57) ABSTRACT

A hardware scheduling circuit may receive priority indications for a plurality of threads for processing, by an execution unit, multiple data samples associated with a signal. A particular thread of the plurality of threads may be scheduled for execution by the execution unit based on a priority of the particular thread and based on an availability of some of the multiple data samples that are to be processed by the particular thread.

20 Claims, 8 Drawing Sheets ns of computing systems, thread-based scheduling may be
used in combination with other scheduling techniques.

SYSTEM FOR SCHEDULING THREADS FOR EXECUTION

BACKGROUND

Technical Field

Embodiments described herein are related to the field of integrated circuit implementation, and more particularly to the implementation of instruction thread scheduling circuits in processor cores.

Description of the Related Art

Many computer systems include multiple processors or processor cores, which execute software or application programs to perform various tasks. Such tasks can range from database storage and analysis, video data stream decryption and decompression, audio data digital signal processing, and the like. The performance of a given task may include the execution of program instructions on one more processors or processor cores.

To make efficient use of compute resources, as well as ensure tasks are afforded access to the compute resources, processors or processor cores employ various techniques for scheduling the execution of program instructions. One such scheduling technique involves sharing compute resources, in a time-domain multiplex fashion, between different software or program applications. For example, a particular software application may execute on a given processor for a period of time. At the end of the period of time, the execution of the particular software application is halted, and its current state saved. The given processor may then begin execution of another software application.

Other scheduling techniques provide finer control of scheduling by scheduling individual execution threads as opposed to entire software applications. When a processor or processor core uses thread-based scheduling, a particular thread may be executed for a period of time, and then halted or paused, allowing another thread to be executed. Such thread-based scheduling may be applied to a single-thread processor or processor core, as well as multi-thread processors or processor cores that include additional circuits that allow for the execution of multiple threads in parallel. In some computing systems, thread-based scheduling may be used in combination with other scheduling techniques.

SUMMARY

Broadly speaking, various techniques are disclosed relating to an execution unit circuit that is configured to process a plurality of data samples associated with a signal and a hardware scheduling circuit that is configured to receive priority indications for a plurality of threads for processing the plurality of data samples. The hardware scheduling circuit may be further configured, based on a priority of a particular thread and based on an availability of at least some of the plurality of data samples that are to be processed by the particular thread, to schedule the particular thread for execution by the execution unit.

In various embodiments, the hardware scheduling circuit may be configured to, in response to a determination that a portion of the plurality of data samples are available to be processed by a higher priority thread of the plurality of threads, cause the execution unit circuit to pause execution of the particular thread and begin execution of the higher priority thread. The hardware scheduling circuit may also be configured to, in response to a determination that execution of the higher priority thread has halted, cause the execution unit circuit to resume execution of the particular thread.

BRIEF DESCRIPTION OF THE DRAWINGS

The following detailed description makes reference to the accompanying drawings, which are now briefly described.

Figure 1:
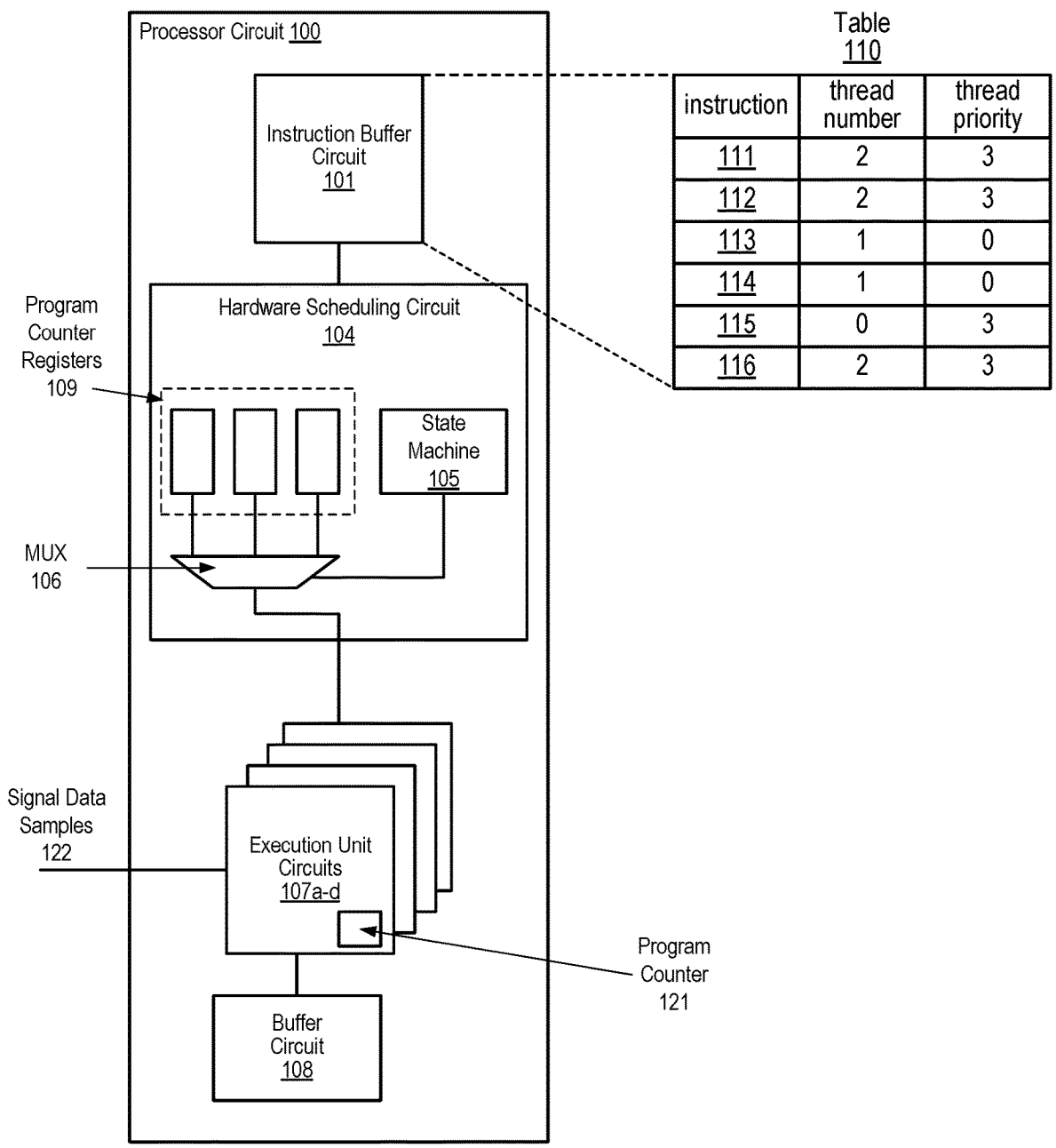
FIG. 1 illustrates a block diagram of an embodiment of a processor core.

While the disclosure is susceptible to various modifications and alternative forms, specific embodiments thereof are shown by way of example in the drawings and will herein be described in detail. It should be understood, however, that the drawings and detailed description are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

In some computer systems, audio signals may be processed in the digital domain to, for example, improve sound quality, analyze the sound data, and/or compress and store the signal. For example, an audio signal may be sampled, and the resulting samples may be processed to filter unwanted sound frequencies, perform echo cancelation, identify spoken words, and the like. Processing of data samples (commonly referred to as digital signal processing) may be performed by dedicated logic circuits or by a processor or processor core executing software or program instructions.

To facilitate the processing of audio signal samples, multi-threaded processor cores may be employed. In a multi-threaded processor core, at least some hardware resources within the core may be shared between two or more software threads by selecting a current thread for execution. The threads, each performing a different processing operation on the audio sample, may be time-domain multiplexed on the shared hardware resources in the processor core. For example, a currently executing thread may be halted or paused at the completion of a given core clock cycle, allowing a different thread access to the shared hardware resources. As used herein, a "software thread," "processing thread," or simply "a thread," refers to a smallest portion of a software program or process that may be managed independently by a processor or processor core.

In order to perform the time-domain multiplexing of the threads on the shared hardware resources, the order in which the various threads are executed on the shared hardware resources is determined using a process called scheduling. In many computer systems, scheduling is software-based and is performed by the processor or processor core executing multiple software or program instructions. In some cases, different threads may perform operations on the stream of audio samples at different rates. Using software-based thread scheduling in such cases may incur too much processing overhead, thereby limiting the amount of processing bandwidth available to perform other tasks, such as audio processing, for example. The embodiments illustrated in the drawings and described below provide techniques for scheduling execution of threads in a manner that reduces processing overhead, which may improve overall system performance and may reduce power consumption.

An audio processor core may process samples of an audio signal that were sampled at a particular sampling rate and perform various tasks on the sampled audio signal. For example, in some embodiments, an audio signal may be filtered to remove unwanted sound frequencies, cancel echoes, remove background noise, and identify spoken words. In such an embodiment, software executed by the audio processor core may be arranged into multiple threads, with one or more threads performing each of the various processing tasks. An output from a first thread may be used as an input to a next thread. Returning to the example tasks, a first thread may filter out unwanted audio frequencies from an audio stream, and a second thread may take the filtered audio stream from the first thread to perform echo cancel-lation. Each of these threads may use several samples of the audio stream to produce a single processed output sample. The first thread, for example, may receive four samples to generate one filtered sample, and the second thread may receive four filtered samples to generate one echo-cancelled sample.

In order to increase informational fidelity of a sampled audio signal, sampling rates of the audio signal may be increased, thereby increasing a number of data points and reducing signal loss. Increased sampling rates, however, may require fast methods for scheduling threads based on thread priorities and resource (e.g., data sample) availability. Using software-based thread scheduling may incur too much processing overhead for higher sampling rates. Embodiments of systems and methods for scheduling threads for audio processing are disclosed herein. The disclosed embodiments may demonstrate improved methods for selecting threads quickly and efficiently.

A block diagram of an embodiment of processor circuit is presented in FIG. 1. In the illustrated embodiment, Processor Circuit 100 includes Instruction Buffer Circuit 101, Hardware Scheduling Circuit 104, and a plurality of Execution Circuits 107*a-d*, collectively referred to as Execution Unit Circuit 107. As described below in more detail, Processor Circuit 100 may be included in a computer system, or fabricated on a common integrated circuit substrate with other circuits to form a System-on-a-chip (SoC).

Processor Circuit 100 may be a particular embodiment of a multi-threaded processor or processor core configured to, based on fetched instructions, perform operations on Signal Data Samples 122. Such instructions may conform to a particular instruction set architecture (ISA) implemented by Processor Circuit 100. In various embodiments, the execution of instructions included in different threads result in different operations, such as, e.g., filtering, noise reductions, speech recognition, and the like, being performing on Signal Data Samples 122.

It is noted that the concept of instruction "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

Different signals may be sampled to generate Signal Data Samples 122. For example, audio signals, video signals, motion/accelerometer signals, and the like, may be sampled to generate Signal Data Samples 122. Sensors or other peripheral devices, such as, e.g., a microphone, may generate the signals to be sampled. In order to sample a signal, an analog-to-digital converter circuit or any other suitable circuit may be employed to sample an analog signal at different points in time and generate one or more data bits corresponding to a value of the analog signal at the different points in time.

Instruction Buffer Circuit 101 is configured to store one or more fetched instructions. The fetched instructions may be stored in a tabular format as illustrated in Table 110. Each fetched instruction may be stored in Table 110 along with identifiers for a processing thread, a thread priority, and a thread number within a particular priority. In some embodiments, the fetched instructions may be decoded prior to storage in Instruction Buffer Circuit 101. It is noted that although only six instructions are depicted as being stored in Instruction Buffer Circuit 101, in other embodiments, any suitable number of instructions may be stored.

Instruction Buffer Circuit 101 may be implemented according to one of various design styles. For example, Instruction Buffer Circuit 101 may be implemented as a static random-access memory (SRAM), a register file, or any other suitable circuit configured to store the instructions and their associated information.

Each of Execution Unit Circuits 107*a-d* is configured to process data samples associated with a signal (Signal Data Samples 122). As described below, to process the data samples, each of Execution Unit Circuits 107*a-d* is configured to execute instructions selected for execution by Hardware Scheduling Circuit 104. In various embodiments, each of Execution Unit Circuits 107*a-d* may execute instructions associated with a corresponding software thread. Any one of Execution Unit Circuits 107*a-d* may include Program Counter 121. In various embodiments, Program Counter 121 is configured to increment or decrement a value that is used to fetch instructions from Instruction Buffer Circuit 101. Program Counter 121 may also be configured to reset to a particular value or store a value received from an external source such as Hardware Scheduling Circuit 104. In some embodiments, Program Counter 121 may include any suitable number of latch circuits, flip-flop circuits, and logic circuits.

In various embodiments, a given one of Execution Unit Circuits 107*a-d* may include multiple logic circuits configured to perform specific tasks in response to executing a particular instruction. For example, the given one of Execution Unit Circuits 107*a-d* may include an arithmetic logic unit (ALU), a graphics-processing unit (GPU), or any other suitable logic circuit.

Hardware Scheduling Circuit 104 is configured to receive priority indications for a plurality of threads for processing the information and based on a priority of a particular thread and based on an availability of at least some of the data samples associated with the signal that are to be processed by the particular thread, schedule the particular thread for execution by Execution Unit Circuit 107. In various embodiments, Hardware Scheduling Circuit 104 may receive the priority indications from Instruction Buffer Circuit 101 along with the instructions included in a particular thread. As described below in more detail, Hardware Scheduling Circuit 104 may employ State Machine 105 to track respective statuses of multiple threads in order to schedule the particular thread for execution.

In order to schedule the particular thread for execution, a hardware scheduling circuit may consider one or more criteria associated with the threads, such as, e.g., readiness for execution, priority, age, and the like. For example, Hardware Scheduling Circuit 104 is also configured to, in response to a determination that a portion of the plurality of data samples are available to be processed by a higher priority thread of the plurality of threads, cause Execution Unit Circuit 107 to pause execution of the particular thread and being execution of the higher priority thread. In order to cause Execution Unit Circuit 107 to pause execution of the particular thread and begin execution of the higher priority thread, Hardware Scheduling Circuit 104 may transmit control signals and state information to Execution Unit Circuit 107. For example, Hardware Scheduling Circuit 104 may transmit interrupt signals, enable signals, program counters values, or any other relevant signals or data to Execution Unit Circuit 107.

In some cases, for a given thread to be ready to execute, operand data for the given thread must be available in a register accessible by an execution unit circuit. During operation, multiple threads may be ready to execute. In order to select one of the threads ready to execute for execution by the execution unit circuit, a hardware scheduling circuit may select a ready thread with a highest priority. If multiple ready threads each have a same priority (i.e., the multiple threads belong to a same "priority group"), then respective thread numbers within the priority group may be used to select one of the threads for execution.

During execution of a higher priority thread, the higher priority thread may halt when complete. When this occurs, Hardware Scheduling Circuit 104 is configured to, in response to a determination that execution of the higher priority thread has halted, cause the Execution Unit Circuit 107 to resume execution of the particular thread. In a similar fashion as described above, Hardware Scheduling Circuit 104 may send control signals and state information to Execution Unit Circuit 107 to cause it to resume execution of the particular thread.

Hardware Scheduling Circuit 104, in the illustrated embodiment, utilizes State Machine 105 to track respective statuses of active threads. Although only a single state machine is depicted in Hardware Scheduling Circuit 104, in some embodiments, a number of priority groups or a number of different priority levels supported by Processor Circuit 100 may determine a number of state machines included in Hardware Scheduling Circuit 104. For example, if Processor Circuit 100 supports four different priority groups, then Hardware Scheduling Circuit 104 may include four state machines to track a state for a chosen thread in each priority group. In other embodiments, more than one state machine may be included for each priority group.

As used herein, a state machine refers to a sequential logic circuit configured to transition between different logical states defined by stored logic values in one more storage circuits, such as latches or flip-flops for example. A transition from one logical state to another may be based on a variety of conditions. For example, each logical state may correspond to a status of a corresponding thread and a transition from one state to another may be based on an availability of data to be processed by the corresponding thread.

As described above, data samples may be processed by the execution of a particular thread. Such processing can result in the generation of output data samples, which may be further processed by the execution of a different thread. In order to allow the generated output data samples resulting from the execution of one thread to be used during the execution of another thread, the generated output data samples may be stored in a buffer circuit, such as, e.g., buffer circuit 108, configured to store output data samples generated as a result of executing the particular thread. As previously mentioned, a different thread may consume the generated data samples, once a sufficient number of data samples have been generated. To allow for the use of the generated data samples, the hardware scheduling circuit is further configured to, in response to an indication that the buffer is storing at least a particular number of data samples generated from the execution of the particular thread, cause the execution unit circuit to pause execution of the particular thread and begin execution of the higher priority thread. Moreover, Execution Unit Circuit 107 is also configured to, in response to beginning execution of the higher priority thread, retrieve, from the buffer, at least some of the data sample generated from the execution of the particular thread.

In addition to scheduling threads based on available data for processing, a hardware scheduling circuit may also use priority information associated with the threads. Threads with a same priority are classified as being included in a same priority group. For example, as illustrated in Table 110, Threads 0 and 2 have the same priority and are, therefore, in the same priority group.

Selection of threads within a particular priority group is based on a secondary priority. As shown, both Thread 0 and 2 are in the same priority group, but Thread 0 will be given a higher priority based on its lower thread number. In some embodiments, the secondary priority of a thread may correspond to a thread number within a priority group. To take advantage of this hierarchy of priorities, Hardware Scheduling Circuit 104 may be further configured to, in response to a determination that execution of the particular thread has halted, cause the execution circuit to begin execution of a different thread with a same priority and a higher second priority than the particular thread.

When the execution of one thread is paused and the execution of another thread is started, state information is exchanged between execution unit circuits and a hardware scheduling circuit. Such state information may include values of program counters, state registers, and the like, which can be stored in Program Counter Registers 109 and transferred to/from Program Counter 121. For example, Hardware Scheduling Circuit 104 is also configured to store respective program counter start values and program counter stop values for each thread of the plurality of threads, and transfer a program counter start value for the particular thread in response to scheduling the particular thread for execution. As illustrated, Program Counter Registers 109 includes a set of registers for each of a number of threads that may be managed concurrently. To exchange state information between Execution Unit Circuits 107 and Hardware Scheduling Circuit 104, a multiplexing circuit, MUX 106, is used to switch connections from a set of Program Counter Registers 109 that store state information for the previous selected thread to a set of Program Counter Registers 109 that store state information for a newly selected thread. State Machine 105, as illustrated, generates a control signal based on a currently selected thread. The control signal causes MUX 106 to select Program Counter Registers corresponding to the currently selected thread. In some embodiments, state information associated with the various threads may be captured in a respective set of registers at multiple stages of an execution pipeline, such as at an instruction fetch stage, and/or an instruction decode stage, as well as the execution stage as shown. By switching state information using hardware circuits such as multiplexing circuits, the hardware scheduling circuit may reduce a time to switch instruction processing between different threads, and may also reduce power consumption associated with the thread switching.

It is noted that the block diagram of Processor Circuit 100 has been simplified in order to more easily explain the disclosed concepts. In other embodiments, different and/or additional circuit blocks, and different configurations of the circuit blocks are possible and contemplated.

Figure 2:
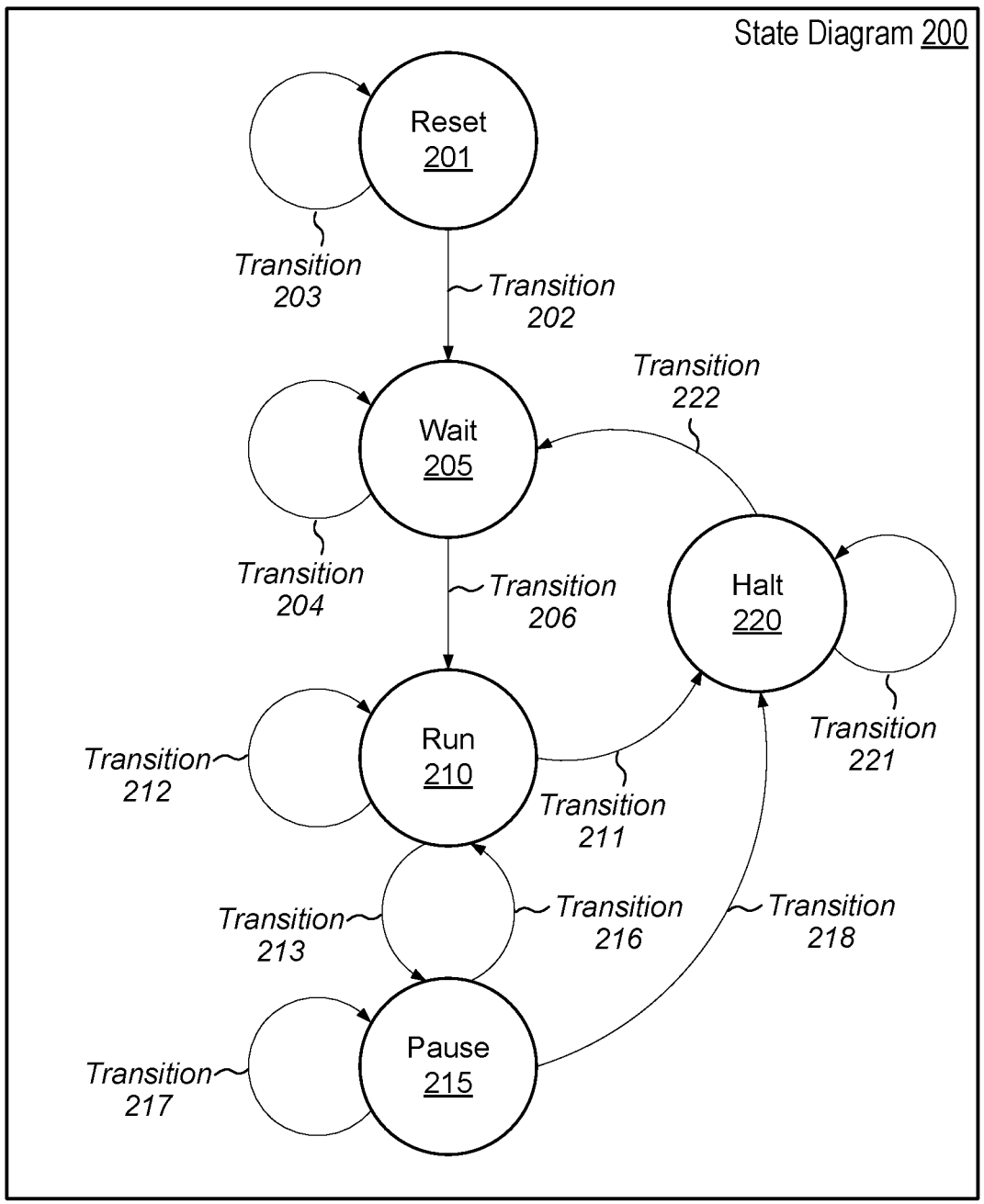
FIG. 2 shows a state diagram for an embodiment of a state machine used to manage processing threads.

As described above, Hardware Scheduling Circuit 104 may employ one or more state machines, such as, e.g., State Machine 105, to track a status of a particular thread. A state diagram for such a state machine is illustrated in FIG. 2.

State Diagram 200 represents the various states of State Machine 105 used in Hardware Scheduling Circuit 104 in FIG. 1. Other state machines are possible as well. As depicted in state diagram 200, each of state machines 105a-d transitions between five states: Reset State 201, Wait State 205, Run State 210, Pause State 215, and Halt State 220, each of which corresponds to a state or status of a particular thread.

State diagram 200, in the illustrated embodiment, begins in Reset State 201. Reset State 201 is the state, in which State Machine 105 begins after a system reset or a power-on event. When a thread being tracked by State Machine 105 completes, State Machine 105 returns to Reset State 201. In Reset State 201, State Machine 105 is assigned to a particular thread as selected by Hardware Scheduling Circuit 104. After the thread has been assigned, State Machine 105 remains in Reset State 201, via Transition 203, until the thread is enabled, at which point, State Machine 105 moves into Wait State 205 via Transition 206.

As indicated by Transition 204, State Machine 105 remains in Wait State 205 until the assigned thread is ready to process. This assigned thread may be ready to process when it is the highest priority thread that is ready to process, and no thread in the same priority group is in Pause State 215. Additionally, State Machine 105 may remain in Wait State 205 if data to be processed by the assigned thread is not available. For example, the assigned thread may receive data from an input buffer and store generated data into an output buffer. The assigned thread, in such an example, is ready to process when the input buffer is full and the output buffer is empty.

When the assigned thread is ready to execute and all dependencies have been cleared, State Machine 105 moves to Run State 210 via Transition 206 and Hardware Scheduling Circuit 104 causes Execution Unit Circuit 107 to begin executing instructions included in the assigned thread. It is noted that in architectures that support the execution of multiple threads in parallel, multiple state machines may be in Run State 210 indicating their respective threads are currently being executed. As indicated by Transition 212, State Machine 105 may remain in Run State 210 until the assigned thread halts due to completion (e.g., due to exhausting data stored in the input buffer), a higher priority thread becomes ready, or the thread is halted for another reason. State Machine 105 may be reset and return to Reset State 201 when the assigned thread is completed. Alternatively, State Machine 105 moves the assigned thread to Halt State 220 via Transition 211 in response to the assigned thread completing.

If a higher priority thread that has become ready supersedes the assigned thread being tracked by State Machine 105, then State Machine 105 moves into Pause State 215 via Transition 213. As indicated by Transition 217, State Machine 105 remains in Pause State 215 until the higher priority thread completes or halts. State Machine 105 may return to Run State 210 via Transition 216 if there are no other higher priority threads ready to execute.

A thread whose associated state machine is in Pause State 215 may be halted for debug purposes. For example, a debugging circuit may issue a halt command, which moves State Machine 105 from Pause State 215 to Halt State 220 via Transition 218. State Machine 105 is configured to remain in Halt State 220 (as indicated by Transition 221) until a debug or other process that initiated the halt operation has completed. At that point, State Machine 105 moves to Wait State 205 via Transition 222 indicating that the assigned thread can once again be considered for scheduling.

It is noted that during operation, State Machine 105 may transition between each of Run State 210, Pause State 215, and Halt State 220 multiple times before the assigned thread completes.

During operation, a currently executing thread may exhaust its pool of data to process, thereby completing the thread execution. If the currently executing thread is relying on data generated by another thread, a mailbox buffer may not include sufficient data samples from the other thread. For example, if the thread assigned to State Machine 205 exhausts its data, then State Machine 105 moves the assigned thread to Halt State 220 via Transition 211. Once any previously executing instructions in the assigned thread have completed, State Machine 105 moves into Wait State 205 via Transition 222 until the mailbox buffer has refilled with data for processing, at which point Hardware Scheduling Circuit 104 can consider the assigned thread for execution.

It is noted that, by using state machines for tracking statuses of multiple threads, a scheduling circuit, such as Hardware Scheduling Circuit 104, may be able to reduce the overhead associated with a context switch between threads. Such a reduction in overhead may result in fewer stalled cycles for Execution Unit Circuit 107 thereby improving the computation efficiency of the computer system per unit time.

It is also noted that the embodiment of FIG. 2 is merely an example. The illustration of FIG. 2 has been simplified to highlight features relevant to this disclosure. Although five states are shown in FIG. 2, other embodiments may include a different number of states.

As described above, an execution unit circuit may switch execution between multiple threads during operation. Such switching between threads is illustrated in the timing diagram depicted in FIG. 3. Chart 300 includes waveforms representing voltage level versus time for nine signals: Thread[0] Ready Signal 320, Thread[1] Ready Signal 321, Thread[2] Ready Signal 322, Thread[0] State Signal 330, Thread[1] State Signal 331, Thread[2] State Signal 332, Thread Select Signal 325, Sample Clock Signal 327, and Analog Signal 329. In the illustrated embodiment, Chart 300 represents signals that may be associated with Processor Circuit 100 in FIG. 1.

Analog Signal 329 corresponds to a signal received from an input device coupled to or included within a computer system. Such input devices can include, without limitation, microphones, camera, sensors circuits, and the like. An input device is configured to generate a signal whose voltage varies in time, where the variation in voltage corresponds to a variation in time of a sensed physical parameter. For example, if the input device is a microphone, the variation in time of Analog Signal 329 corresponds to changes in sound levels detected by the microphone.

In order to perform digital signal processing on Analog Signal 329, data samples based on Analog Signal 329 are generated. As described below in more detail, Analog Signal 329 may be sampled, using an analog-to-digital converter circuit, at multiple different time points to generate data samples, such as Signal Data Samples 122 for example. Once sampled, the generated data samples may be stored in a buffer or other suitable storage location prior to being processed. In various embodiments, the multiple different time points may be defined using a clock signal, such as Sample Clock Signal 327. A frequency of Sample Clock Signal 327 may be based on at least a frequency component of Analog Signal 329 in order to generate sufficient data samples to ensure proper translation of Analog Signal 329 into a digital domain. In some cases, the frequency and a phase of Sample Clock Signal 327 may be different than a frequency and a phase of a clock signal used elsewhere in a computer system.

As shown, signals Thread[0] Ready Signal 320, Thread[1] Ready Signal 321, and Thread[2] Ready Signal 322 correspond to respective threads listed in Table 110 and may indicate when the respective thread is ready for processing. For example, the thread ready signals may assert when a respective input buffer is full and a respective output buffer is empty, signifying that the associated thread is ready to process.

Thread Select Signal 325 may indicate which thread of a plurality of threads being scheduled by Hardware Scheduling Circuit 104 is currently selected. Thread [0] State 330, Thread [1] State 331, and Thread [2] State 332 indicate which state, as described above in regards to FIG. 2, the corresponding thread is in at a given point in time.

As part of the digital signal processing being performed by Processor Circuit 100, different operations may be performed on the data sample as each of Thread[0], Thread[1], and Thread[2] are executed. For example, Thread[2] may retrieve data samples from a location in memory. Thread[1] may perform a filtering algorithm on the data samples, while Thread[0] may perform a pattern recognition process. For example, in the case of Analog Signal 329 being an audio signal, the filtering algorithm may be applied to reduce background noise, and the pattern recognition process may be used to identify a particular sound or spoken phrase included in the audio signal.

Prior to time t1, all three threads are in respective Wait States 205, as indicated by Thread [0] State 330, Thread [1] State 331, and Thread [2] State 332. At time t1, Thread[2] is ready to process as indicated by the rising transition of Thread[2] Ready Signal 322. Hardware Scheduling Circuit 104 selects thread 2 as the highest priority thread that is ready to process and transitions thread 2 into Run State 210. As part of selecting Thread[2], Hardware Scheduling Circuit 104 may send instructions from Thread[2] to be executed by Execution Unit Circuit 107 thereby allowing operation(s) defined by the instructions in Thread[2] to be performed on data samples in a corresponding input buffer. Hardware Scheduling Circuit 104 may continue to send instructions from Thread[2] until circumstances change. It is noted that Thread[2] Ready 322 returns to a low state before Thread[2] exits Run State 210. As described above, a ready signal may be based on an input buffer being full and an output buffer being empty. Once Thread[2] begins to process data from the respective input buffer, the input buffer may no longer be full and the output buffer will start to collect output values and therefore no longer be empty. Thread[2] Ready 322, therefore, returns to the low state after Thread[2] has processed data and changed a state of the input and/or output buffers.

At time t2, Thread[1] Ready Signal 321 is asserted, indicating that Thread[1] is ready to be executed. In various embodiments, Hardware Scheduling Circuit 104 may have detected that corresponding input and output buffers for Thread[1] are full and empty, respectively. Since Thread[1] has a higher priority than Thread[2], Hardware Scheduling Circuit 104 places Thread[2] into Pause State 215, and selects Thread[1], as indicated by Thread Select Signal 325, and moves Thread[1] into Run State 210.

Once Thread[1] is selected and running, Hardware Scheduling Circuit 104 sends instructions from Thread[1] to Execution Unit Circuit 107 for execution. Hardware Scheduling Circuit 104 may continue to send the instructions until Thread[1] has completed, which occurs at time t4. Thread[1]

Ready 321 returns to a low state after Thread[2] has processed data and changed a state of respective input and/or output buffers.

Figure 3:
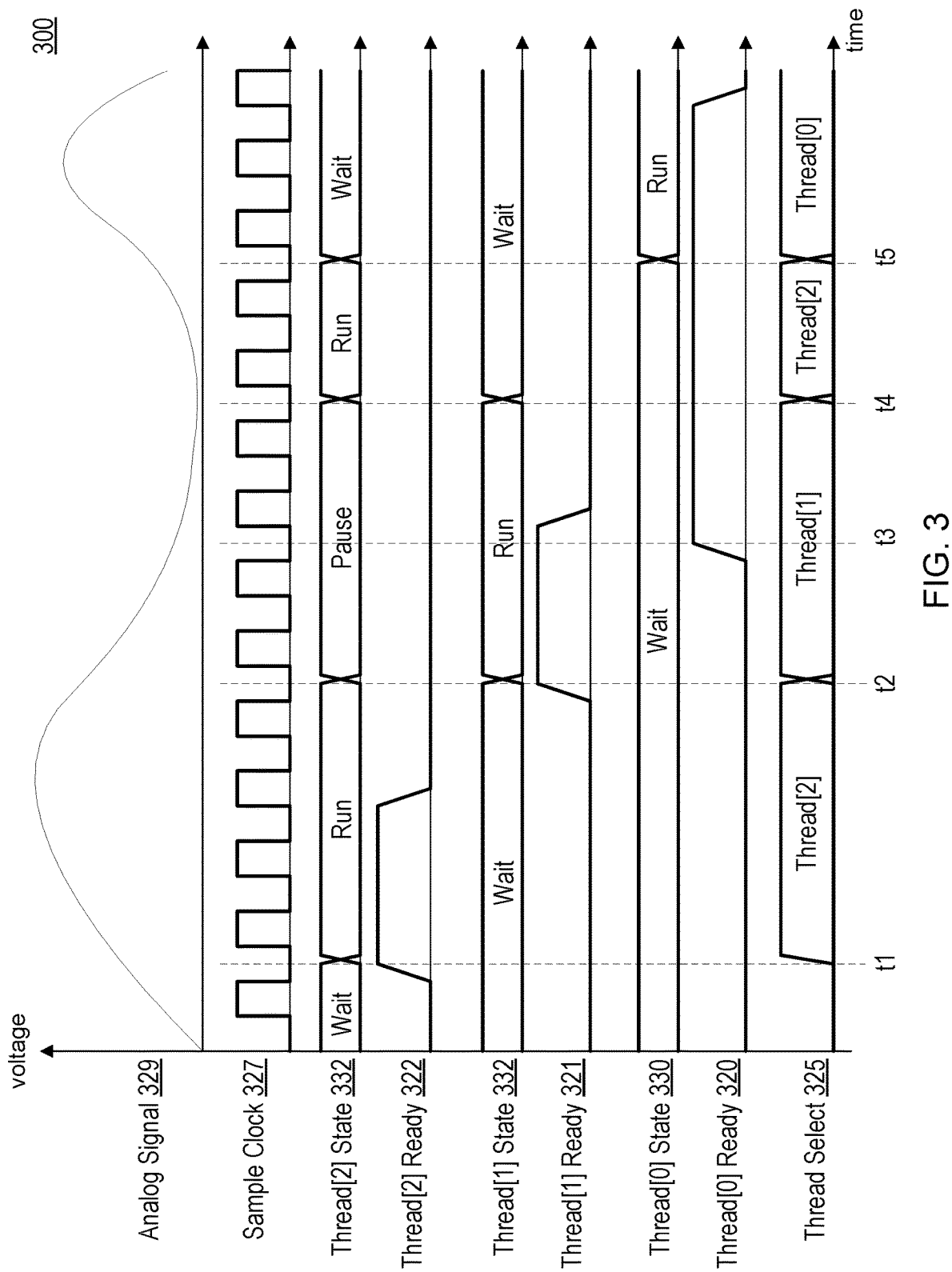
FIG. 3 depicts a timing chart associated with execution of processing threads in a processor core.

While Thread[1] is executing, other threads may become ready for execution. When this occurs, Hardware Scheduling Circuit 104 may rely on the respective priorities of the threads to determine which thread should be executed. For example, at time t3, while Thread[1] is executing, Thread[0] Ready Signal 320 is asserted, indicating that Thread[0] is now ready for execution. Since Thread[1] has a higher priority than Thread[0], the execution of Thread[1] continues while Thread[0] remains in Wait State 205. At time t4, the status of Thread[1] completes. Hardware Scheduling Circuit 104 places Thread[1] into Wait State 205 and checks the status of the remaining threads to select a new thread for execution. As shown in FIG. 3, Thread[0] Ready Signal 320 is asserted at time t4 when Thread[1] Ready Signal 321 de-asserts, while Thread[2] is in Pause State 215, waiting to complete. Hardware Scheduling Circuit 104 may use multiple criteria, such as thread number and current status of individual threads, to select which thread is selected for execution.

As shown in Table 110 in FIG. 1, both Thread[0] and Thread[2] belong to priority group 3, so Hardware Scheduling Circuit 104 may normally select Thread[0] for execution since it has a lower (i.e., higher priority) thread number than Thread[2]. The statuses of Thread[2] and Thread[0], however, result in a different selection. Thread[2] is in Pause State 215 while Thread[0] is in Wait State 205, resulting in Hardware Scheduling Circuit 104 selecting Thread[2] as indicated by Thread Select Signal 325. Hardware Scheduling Circuit 104 moves Thread[2] back into Run State 210, which continues executing until time t5, when Thread[2] completes. As before, Hardware Scheduling Circuit 104 may then select another thread for execution by Execution Unit Circuit 107. In the illustrated case, Thread[0] may now be selected and moved into Run State 210.

It is noted that the waveforms described in FIG. 3 are examples associated with the operation of a particular embodiment of a hardware scheduling circuit and have been simplified for the purposes of illustration. In other embodiments, different computer hardware and different environmental conditions, such as, e.g., power supply voltage level, may result in waveforms with a different appearance than what is illustrated in FIG. 3.

It is also noted that use of the pause state may prevent a thread of equal primary priority, but a higher secondary priority, from being selected over a paused thread with the same primary priority but lower secondary priority. This "atomicity," or lowest level of thread processing, allows data to be shared between two threads of equal priority without risk of data corruption. For example, if a paused thread is not prioritized over a different thread of equal primary priority, then the different thread could take a partial output of data completed by the paused thread and mix this with old data that the paused thread has not yet processed. By allowing the paused thread to resume execution before any other thread of equal or lower priority can begin may result in the other threads receiving data that has completed processing, and avoid mixing a combination of old and new data which could result in inaccurate data processing.

Figure 4:
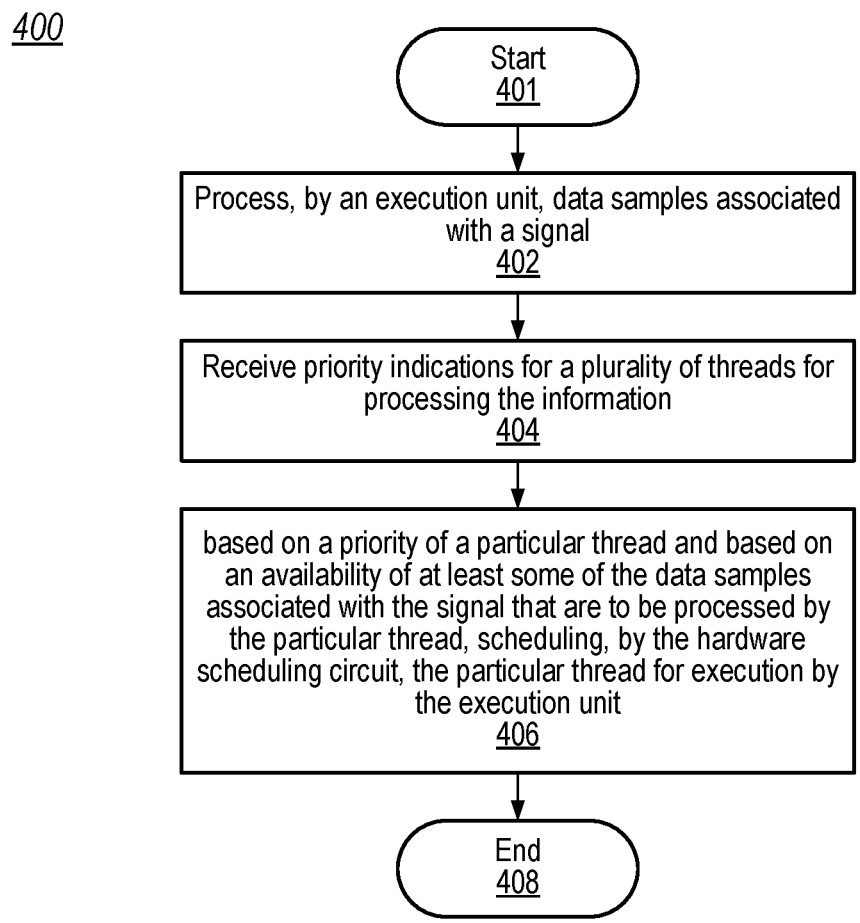
FIG. 4 illustrates a flow diagram of an embodiment of a method for managing thread selection in a processor core.

Turning now to FIG. 4, a flow diagram of an embodiment of a method for scheduling multiple threads is illustrated. Method 400 may be performed by a hardware scheduling circuit, such as, Scheduling Circuit 104 as depicted in FIG. 1. Referring collectively to FIG. 1 and the flow diagram of FIG. 4, Method 400 begins in block 401.

Execution Unit Circuit 107 may then process data samples associated with a signal (block 402). In various embodiments, the signal may be an audio signal, such as, Analog Signal 329, for example. Analog Signal 329 may correspond to an audio stream from a microphone or other audio source. Alternatively, Execution Unit Circuit 107 may process data samples associated with other types of signals. For example, data samples from a signal generated by a camera or Execution Unit Circuit 107 may process motion detection unit. In some embodiments, an analog-to-digital converter circuit may generate the data samples or other suitable circuit used to sample the signal.

Hardware Scheduling Circuit 104 may then receive priority indications for a plurality of threads for processing the information (block 404). For example, Hardware Scheduling Circuit 104 receives the thread priority information included in Table 110 for instructions stored in Instruction Buffer Circuit 101 corresponding to threads 0, 1, and 2. Each of the threads may perform a different function on the data samples associated with the signal. In some embodiments, output data generated by one thread may, in turn, be used as data samples input to another thread. The priority indications may be related to a particular function performed by a given thread and/or to a need for the output of the given thread to use as input samples for a different thread.

Based on a priority of a particular thread and based on an availability of at least some of the data samples associated with the signal that are to be processed by the particular thread, scheduling, by Hardware Scheduling Circuit 104, the particular thread for execution by the Execution Unit Circuit 107 (block 406). In various embodiments, the conditions Once the particular thread has been scheduled for execution, the method concludes in block 408.

To schedule the particular thread, Hardware Scheduling Circuit 104 may determine which thread, of threads that area waiting, has a higher priority than the other threads. If two or more threads are in the same highest priority group, then a thread with a lowest thread number may be chosen. As part of scheduling the particular thread, Hardware Scheduling Circuit 104, may determine if the thread chosen based on priority is ready to process. For example, in the case of thread 1 being chosen based on priority, if data samples and any other relevant resources for processing these data samples are available, then thread 1 may be ready to process.

Hardware Scheduling Circuit 104 may detect the readiness of a chosen thread by polling one or more signals (e.g., a signal such as Thread[1] Ready 321), and schedule the chose thread for execution by Execution Unit Circuit 107 based on the signal. Otherwise, if data samples for processing thread 1 are not available, then Hardware Scheduling Circuit 104 may choose, based on priority, another thread from the set of waiting threads. When Hardware Scheduling Circuit 104 schedules the selected thread for execution by the Execution Unit Circuit 107, it may retrieve one or more instructions for thread 1 from Instruction Buffer Circuit 101 and send the retrieved instructions to Execution Unit Circuit 107.

It is noted that the method illustrated in FIG. 4 is merely an example embodiment. Variations on this method are possible. Some operations may be performed in a different sequence, and/or additional operations may be included.

Figure 5:
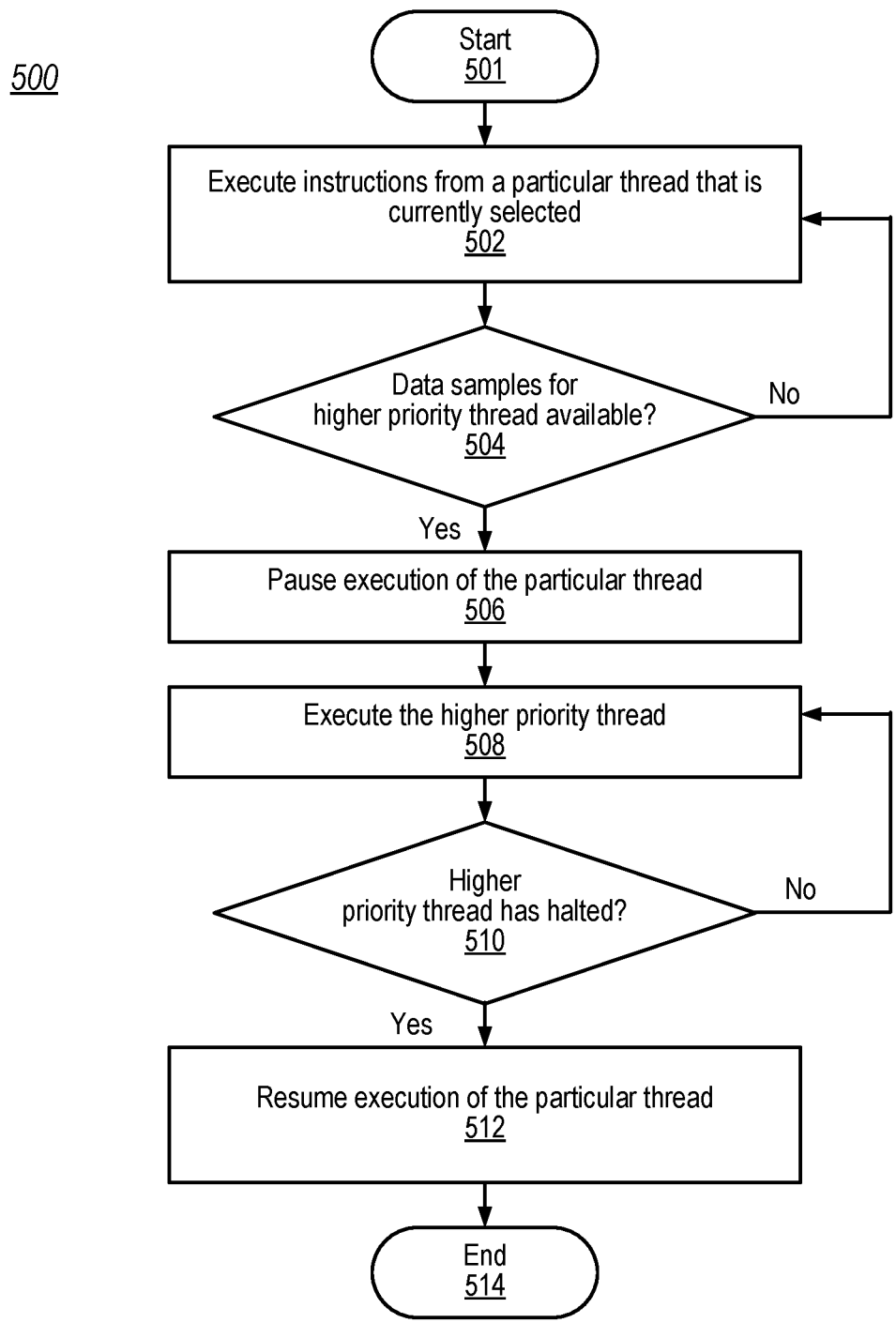
FIG. 5 shows a flow diagram of an embodiment of a method for pausing execution of a thread for a higher priority thread.

As described above, a hardware scheduling circuit may evaluate different criteria such as, e.g., an availability of data, priorities of threads, and the like to determine how threads are to be scheduled for execution by an execution unit circuit. Based on such criteria, the hardware scheduling circuit may cause the execution unit circuit to pause a currently running thread in order to run a different thread. An example of how execution of a thread may be paused is illustrated in the flow diagram of FIG. 5.

As with Method 400, Method 500 may be used in conjunction with a hardware scheduling circuit, such as, for example, Hardware Scheduling Circuit 104 in FIG. 1. In various embodiments, Method 500 may be employed after a first thread has begun to be executed, and Methods 400 and 500 may be used concurrently. Referring collectively to FIGS. 1 and 3, and the flow diagram of FIG. 5, Method 500 begins in block 501.

An execution unit circuit executes instructions from a particular thread that is currently selected (block 502). As described above, Hardware Scheduling Circuit 104 selects a particular thread and causes Execution Unit Circuit 107 to execute the particular thread. In some embodiments, Hardware Scheduling Circuit 104 may load a program counter start value into a program counter included in Execution Unit Circuit 107. The program counter start value may correspond to an address of in memory that contains an instruction included in the particular thread. Hardware Scheduling Circuit 104 may also activate one or more control signals that cause Execution Unit Circuit 107 to stop fetching and executing instructions so that the information relating to the particular thread, such as, e.g., the program counter start value, may be loaded into Execution Unit Circuit 107.

Once the information relating to the particular thread has been loaded into Execution Unit Circuit 107, fetching and execution of instructions included in the particular thread may begin. Execution Unit Circuit 107 may increment a program counter, as instructions are being fetched and executed. The value of the program counter may be relayed to Hardware Scheduling Circuit 104 for the purposes of tracking a status of the particular thread. The method may then depend on statuses of other threads being tracked by Hardware Scheduling Circuit 104 (block 504).

In various embodiments, Hardware Scheduling Circuit 104 may be tracking the status of multiple threads. Such tracking may include determining if data samples to be processed by a given thread are available, checking a number of data samples that have been processed by a currently executing thread, checking the state of various enable and reset signals, and the like. As threads become ready to execute, i.e., there are no dependencies that would prevent execution, Hardware Scheduling Circuit 104 may then compare priorities of ready threads to the currently executing thread.

If there are no threads of higher priority than the particular thread, then the method continues from block 502 as described above. Alternatively, if there is a thread with higher priority than the particular thread that is ready to execute, then Hardware Scheduling Circuit 104 will cause Execution Unit Circuit 107 to pause execution of the particular thread (block 506). In some cases, Execution Unit Circuit 107 may send state information for the particular thread, such as, e.g., a program counter value, to Hardware Scheduling Circuit 104 for use when execution of the particular thread is to be resumed.

Once the particular thread has been paused, execution of a higher priority thread may begin (block 508). Hardware Scheduling Circuit 104 may then continue to check various criteria while the higher priority thread is executing. As other threads become ready for execution, Hardware Scheduling Circuit 104 may change the status of the higher priority thread. For example, as shown in FIG. 3, Thread[1] becomes ready at time t2 as noted by the activation of the Thread[1] Ready 321 signal. Since Thread[1] has a higher priority than Thread[2], Hardware Scheduling Circuit 104 causes Execution Unit Circuit 107 to pause execution of Thread[2] and being execution of Thread[1].

As described above, Hardware Scheduling Circuit 104 may employ respective state machines to track statuses of multiple threads. When one thread is paused and another thread becomes active, Hardware Scheduling Circuit 104 changes the status of the involved threads. For example, moves Thread[1] from Wait State 205 into Run State 210, and moves Thread[2] from Run State 210 to Pause State 215.

With Execution Unit Circuit 107 executing the higher priority thread, the method then depends on a status of the higher priority thread (block 510). If the higher priority thread has not halted, then the method may continue from block 508 as described above.

Alternatively, if the higher priority thread has been halted, then execution of the particular thread may resume (block 512). Hardware Scheduling Circuit 104 may change the status of the higher priority thread to Halt State 220. Additionally, Hardware Scheduling Circuit 104 may select another thread for execution. Such a selection may be made based on respective priorities of the threads, availability of data to be processed, and the like. If the previously paused thread is ready for execution and there are not other threads of higher priority ready for execution, then Hardware Scheduling Circuit 104 may change the status of the previously paused thread from a paused state to a run state, and transfer any state information to Execution Unit Circuit 107 so that execution of the previously paused thread may resume. The method may then conclude in block 514.

It is noted that Method 500 describes the transition between two threads. In other cases, Hardware Scheduling Circuit 104 may be scheduling multiple threads, any of which may be scheduled for execution following a currently executing thread being paused or halted.

As described above, output data samples generated by one thread may be used as input data samples to another thread. In some cases, a buffer circuit (commonly referred to as a "mailbox buffer") may be used to allow the involved threads to share the data samples. For example, in the embodiment illustrated in FIG. 1., buffer circuit 108 may be used as a mailbox buffer. One thread fills the mailbox buffer with generated data samples, and another thread uses the generated data sample from the mailbox buffer. In some cases, the scheduling of which thread is being executed may depend on a number of data samples stored in the mailbox buffer.

Figure 6:
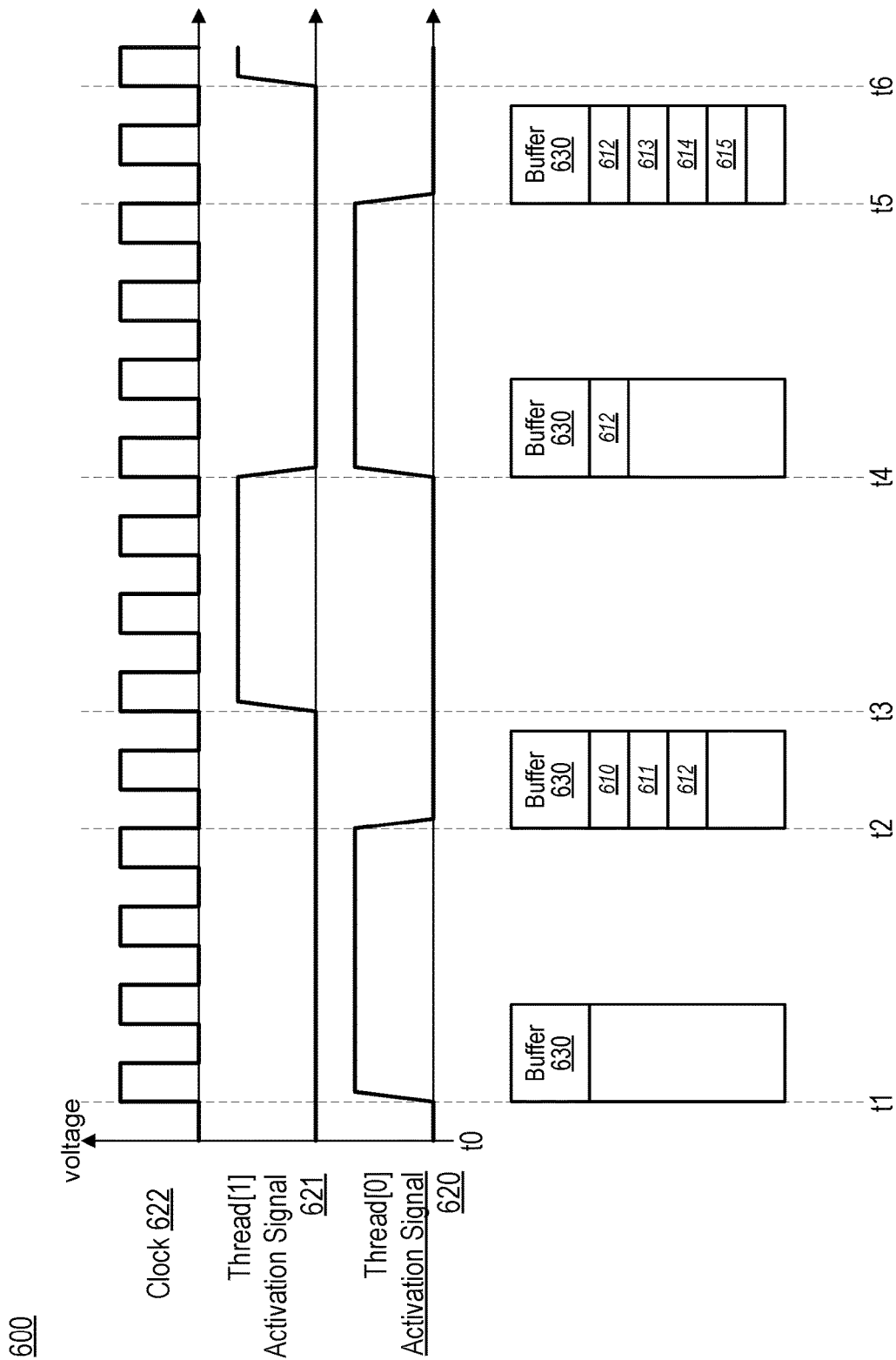
FIG. 6 shows a timing chart in combination with a buffer for passing data between processing threads.

A timing chart illustrating the use of a mailbox buffer is shown in FIG. 6. Chart 600 includes waveforms representing voltage levels versus time for three signals: Thread[0] Activation Signal 620, Thread[1] Activation Signal 621, and Clock Signal 622. In some cases, such waveforms may be representative of signals associated with Processor Circuit 100 as illustrated in FIG. 1. As shown, Thread[0] Activation Signal 620 indicates Thread[0] is running or active on an execution unit circuit and Thread[1] Activation Signal 621 indicates when Thread[1] is running or active on the execution unit circuit. Clock Signal 622 corresponds to a clock or other timing reference signal that may be employed by a processor circuit.

In addition to the waveforms described above, chart 600 also includes a depiction of the contents of a mailbox buffer. The contents of Buffer 630, which may correspond to Buffer Circuit 108, are depicted at four points in time: t1 through t4. At each point in time, Buffer 630 is shown storing different number of data samples as Thread[0] and Thread[1] store data samples and retrieve data samples from Buffer 630.

Beginning at time t0, neither Thread[0] Activation Signal 620 nor Thread [1] Activation Signal 621 is asserted, indicating that both threads are inactive. When inactive, the threads may be in any of states Wait 205, Halt 220, or Pause 215 as depicted in FIG. 2. At time t1, Thread [0] Activation Signal 620 is asserted, indicating that Thread[0] is now running. Thread [0] 620 remains asserted for three cycles of Clock Signal 622 allowing Thread[0] to process data samples during that time.

When a thread processes data samples, output data samples are generated, some of which may be used as input data samples for another thread. To allow for such output data samples to be used by another thread, the output data samples are stored in a mailbox buffer. For example, Thread [0] generates Data Samples 610-612 prior to the de-assertion of Thread[0] Activation Signal 620. At that time, Data Samples 610-612 are stored in Buffer 630. Although the data samples are shown as being stored in Buffer 630 simultaneously, in other embodiments, a given data sample generated by a particular thread may be stored in Buffer 630 as soon as it is generated.

Once output data samples have been stored in a mailbox buffer, the output data samples may be retrieved and processed by another thread. In some cases, the number of output data samples that have been stored in the mailbox buffer may be used by a hardware scheduling circuit to determine if a subsequent thread can run. When the subsequent thread is running, the output data samples are then retrieved from the mailbox buffer for further processing.

An example of an exchange of data samples between threads is illustrated at time t3 in Chart 600. At time t3, Thread[1] Activate Signal 621 asserts, indicating that Thread[1] is running. Thread[1] remains running for three cycles of Clock Signal 622, during which Thread[1] retrieves and processes Data Samples 610 and 611 from Buffer 630. In some cases, multiple data samples may be retrieved from the mailbox buffer during respective clock signal cycles. For example, an execution unit circuit may retrieve a first data sample during a first clock signal cycle, and a second data sample may be retrieved during a second clock signal cycle. During the second clock signal cycle, the execution unit circuit may process the first data sample in parallel with retrieving the second data sample.

At time t4, the context of the execution unit circuit switches again, with Thread[0] becoming active while Thread[1] is paused or halted. The switch between Thread [1] and Thread[0] may be based on priorities of the two threads as well as number of data samples available for Thread[1] to process. For example, if there are insufficient data samples for Thread[1] to process, Thread[1] may be paused or halted and another thread activated. Alternatively or additionally, respective priorities of threads may be used to change which thread is active. In the illustrated diagram, Thread[0] may have a higher priority than Thread[1] and may be ready to execute at time t4, thereby pausing Thread [1] and activating Thread[0].

From time t4 to time t5, Thread[0] processes another three data samples and stores the results of each sample in Buffer 630 as Data Samples 613-615. At time t5, Thread[0] Activation Signal 620 de-asserts and at time t6, Thread[1] Activation Signal 621 asserts, indicating Thread[1] is running. Once running, Thread[1] may resume processing data samples stored in Buffer 630. Although there is a one-clock signal delay between the de-assertion of Thread[0] Activation Signal 620 and the assertion of Thread[1] Activation Signal 621 in the illustrated diagram, in other embodiments, any suitable number of clock cycles between a de-assertion of an activation signal for a particular thread, and an assertion of an activation signal for another thread.

It is noted that Chart 600 of FIG. 6 is an example for demonstrative purposes. For simplicity, Chart 600 depicts a single data being processed in approximately one clock cycle an active thread. In other embodiments, multiple data samples may be processed during a single clock cycle. Alternatively or additionally, multiple clock cycles may be employed to process a single data sample.

Figure 7:
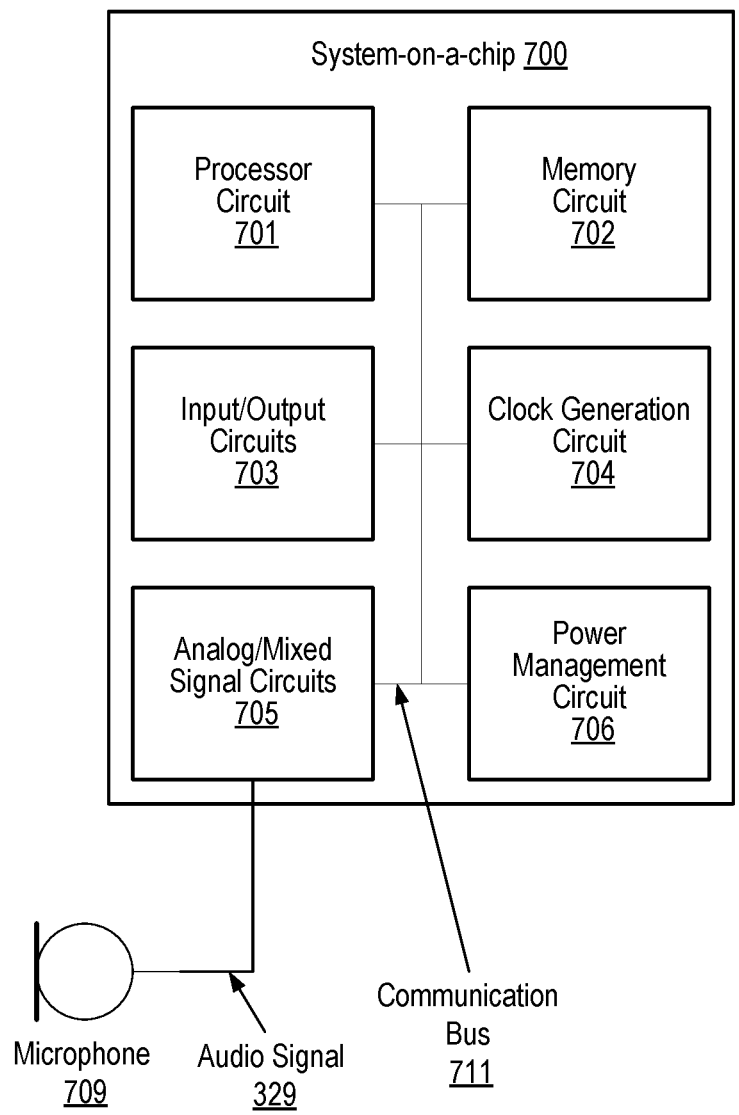
FIG. 7 shows a block diagram of an embodiment of a system-on-chip (SoC).

Hardware scheduling circuits, such as those described above may be used in a variety of computer systems, such as a system-on-a-chip (SoC) for example. A block diagram illustrating an embodiment of an SoC that employs a hardware scheduling circuit is illustrated in FIG. 7. In some embodiments, SoC 700 may provide an example of an integrated circuit that includes Processor Core 100 in FIG. 1. As shown, SoC 700 includes Processor Circuit 701, Memory Circuit 702, Input/Output Circuits 703, Clock Generation Circuit 704, Analog and Mixed Signal Circuits 705, and Power Management Circuit 706. SoC 700 is coupled to Microphone 709. In various embodiments, SoC 700 may be configured for use in a desktop computer, server, or in a mobile computing application such as, e.g., a tablet, laptop computer, or wearable computing device.

In some embodiments, Processor Circuit 701 may, correspond to or include Processor Core 100. Processor Circuit 701, in various embodiments, may be representative of a general-purpose processor that performs computational operations. For example, Processor Circuit 701 may be a central processing unit (CPU) such as a microprocessor, a microcontroller, an application-specific integrated circuit (ASIC), or a field-programmable gate array (FPGA). In some embodiments, Processor Circuit 701 may correspond to a special purpose processing core, such as a graphics processor, audio processor, or network processor, while in other embodiments, Processor Circuit 701 may correspond to a general purpose processor configured and/or programmed to perform one such function. Processor Circuit 701, in some embodiments, may correspond to a processor complex that includes a plurality of general and/or special purpose processor cores.

Memory Circuit 702, in the illustrated embodiment, includes one or more memory circuits for storing instructions and data to be utilized within SoC 700 by Processor Circuit 701. In various embodiments, Memory Circuit 702 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of SoC 700, a single memory circuit is depicted. In other embodiments, any suitable number of memory circuits may be employed.

Input/Output Circuits 703 may be configured to coordinate data transfer between SoC 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, Input/Output Circuits 703 may be configured to implement a version of Universal Serial Bus (USB) protocol or IEEE 1394 (Firewire®) protocol.

Input/Output Circuits 703 may also be configured to coordinate data transfer between SoC 700 and one or more devices (e.g., other computing systems or integrated circuits) coupled to SoC 700 via a network. In one embodiment, Input/Output Circuits 703 may be configured to perform the data processing necessary to implement an Ethernet (IEEE 702.3) networking standard such as Gigabit Ethernet or 10-Gigabit Ethernet, for example, although it is contemplated that any suitable networking standard may be implemented. In some embodiments, Input/Output Circuits 703 may be configured to implement multiple discrete network interface ports.

Clock Generation Circuit 704 may be configured to enable, configure and manage outputs of one or more clock sources. In various embodiments, the clock sources may be located in Analog/Mixed-Signal Circuits 705, within Clock Generation Circuit 704, in other blocks with SoC 700, or come from a source external to SoC 700, coupled through one or more I/O pins. In some embodiments, Clock Generation Circuit 704 may be capable of enabling and disabling (i.e. gating) a selected clock source before it is distributed throughout SoC 700. Clock Generation Circuit 704 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Power Management Circuit 706 may be configured to generate a regulated voltage level on a power supply signal for Processor Circuit 701, Input/Output Circuits 703, and Memory Circuit 702. In various embodiments, Power Management Circuit 706 may include one or more voltage regulator circuits, such as, e.g., a buck regulator circuit, configured to generate the regulated voltage level based on an external power supply (not shown). In some embodiments any suitable number of regulated voltage levels may be generated.

Microphone 709 is coupled to Analog/Mixed Signal Circuits 705 and is configured to generate Analog Signal 329 based on received air pressure variations associated with sound waves. Analog Signal 329 may be an analog signal where changes in received air pressure are represented as variations in a voltage level of the analog signal over time. In various embodiments, Microphone 709 may be constructed according to one of various design styles. For example, Microphone 709 may be condenser microphone, a piezoelectric microphone, or any other suitable type of microphone. Microphone 709 may, in some cases, be fabricated on SoC 700, or may be external to SoC 700 and coupled to SoC 700 via a wired or wireless connection.

Although Analog Signal 329 is described above as being an analog signal, in other embodiments, Microphone 709 may include an analog-to-digital converter (ADC) circuit that is configured to directly sample an output of a transducer or other suitable circuit to generate data samples. In such cases, Microphone 709 may communicate with Input/Output Circuits 703 to send the data samples to Processor Circuit 701.

Analog/Mixed Signal Circuits 705 is configured to generate data samples of Analog Signal 329 and transmit the data samples to Processor Circuit 701 via Communication Bus 711. In some embodiments, an analog-to-digital converter (ADC) circuit may determine a magnitude of a voltage level of Audio Signal 329 at multiple time points to generate the data samples. Each data sample may include multiple data bits that correspond to a particular voltage level of Analog Signal 329 at a particular time point.

Additionally, Analog/Mixed-Signal Circuits 705 may include a variety of circuits including, for example, a crystal oscillator, PLL or FLL, and a digital-to-analog converter (DAC) (all not shown) configured to generated signals used by SoC 700. In some embodiments, Analog/Mixed-Signal Circuits 705 may also include radio frequency (RF) circuits that may be configured for operation with cellular telephone networks. Analog/Mixed-Signal Circuits 705 may include one or more voltage regulators to supply one or more voltages to various functional blocks and circuits within those blocks.

It is noted that the embodiment illustrated in FIG. 7 includes one example of an integrated circuit. A limited number of circuit blocks are illustrated for simplicity. In other embodiments, any suitable number combination of circuit blocks may be included.

Figure 8:
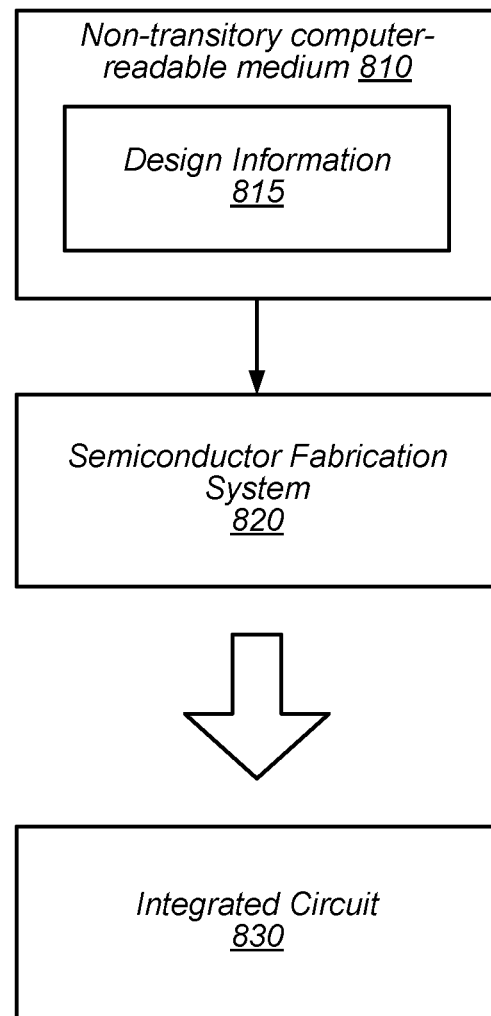
FIG. 8 is a block diagram depicting an example computer-readable medium.

FIG. 8 is a block diagram illustrating an example of a non-transitory computer-readable storage medium that stores circuit design information, according to some embodiments. The embodiment of FIG. 8 may be utilized in a process to design and manufacture integrated circuits, such as, for example, an IC that includes Processor Core 100 of FIG. 1. In the illustrated embodiment, Semiconductor Fabrication System 820 is configured to process the Design Information 815 stored on Non-Transitory Computer-Readable Storage Medium 810 and fabricate Integrated Circuit 830 based on the Design Information 815.

Non-Transitory Computer-Readable Storage Medium 810, may comprise any of various appropriate types of memory devices or storage devices. Non-Transitory Computer-Readable Storage Medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-Transitory Computer-Readable Storage Medium 810 may include other types of non-transitory memory as well or combinations thereof. Non-Transitory Computer-Readable Storage Medium 810 may include two or more memory mediums, which may reside in different locations, e.g., in different computer systems that are connected over a network.

Design Information 815 may be specified using any of various appropriate computer languages, including hardware description languages such as, without limitation: VHDL, Verilog, SystemC, SystemVerilog, RHDL, M, MyHDL, etc. Design Information 815 may be usable by Semiconductor Fabrication System 820 to fabricate at least a portion of Integrated Circuit 830. The format of Design Information 815 may be recognized by at least one semiconductor fabrication system, such as Semiconductor Fabrication System 820, for example. In some embodiments, Design Information 815 may include a netlist that specifies elements of a cell library, as well as their connectivity. One or more cell libraries used during logic synthesis of circuits included in Integrated Circuit 830 may also be included in Design Information 815. Such cell libraries may include information indicative of device or transistor level netlists, mask design data, characterization data, and the like, of cells included in the cell library.

Integrated Circuit 830 may, in various embodiments, include one or more custom macrocells, such as memories, analog or mixed-signal circuits, and the like. In such cases, Design Information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor Fabrication System 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor Fabrication System 820 may also be configured to perform various testing of fabricated circuits for correct operation.

In various embodiments, Integrated Circuit 830 is configured to operate according to a circuit design specified by Design Information 815, which may include performing any of the functionality described herein. For example, Integrated Circuit 830 may include any of various elements shown or described herein. Further, Integrated Circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
an execution unit circuit configured to process a plurality of data samples associated with a signal; and
a hardware scheduling circuit configured to:
receive priority indications for a plurality of threads for processing the plurality of data samples;
store respective program counter start values for each thread of the plurality of threads;
based on a priority of a particular thread and based on an availability of at least some of the plurality of data samples that are to be processed by the particular thread, schedule the particular thread for execution and transfer a program counter start value for the particular thread to the execution unit circuit; and
in response to a determination, during a particular clock cycle, that a portion of the plurality of data samples are available to be processed by a different thread of the plurality of threads that has a higher priority than the particular thread;
save a current value of the program counter for the particular thread; and
transfer a program counter start value for the different thread to the execution unit circuit to permit the different thread to begin execution in a next clock cycle.

2. The apparatus of claim 1, wherein the hardware scheduling circuit is further configured to, in response to saving the current value of the program counter for the particular thread, cause the execution unit circuit to pause execution of the particular thread.

3. The apparatus of claim 2, wherein the hardware scheduling circuit is further configured to, in response to a determination that execution of the different thread has halted, cause the execution unit circuit to resume execution of the particular thread.

4. The apparatus of claim 2, wherein the execution unit circuit includes a buffer circuit configured to store output data samples generated as a result of executing the particular thread, and wherein the hardware scheduling circuit is further configured to, in response to an indication that the buffer circuit is storing at least a particular number of data samples generated from the execution of the particular thread, cause the execution unit circuit to pause execution of the particular thread and begin execution of the different thread.

5. The apparatus of claim 4, wherein the execution unit circuit is further configured to, in response to beginning execution of the different thread, retrieve, from the buffer circuit, at least some of the data samples generated from an execution of the particular thread.

6. The apparatus of claim 1, wherein the priority indications for the plurality of threads includes a primary priority and a secondary priority for each thread, and wherein the hardware scheduling circuit is further configured to, cause the execution unit circuit to pause execution of the particular thread in response to a determination that the different thread has a higher primary priority than the particular thread.

7. The apparatus of claim 6, wherein the hardware scheduling circuit is further configured to:
determine that one or more of the plurality of data samples are available to be processed by a third thread of the plurality of threads, the third thread having a same primary priority and higher secondary priority than the particular thread; and
in response to a determination that the different thread has halted, resume processing of the particular thread.

8. A method, comprising:
receiving, by a hardware scheduling circuit, priority indications for a plurality of threads for processing a plurality of data samples associated with a signal;
storing, by the hardware scheduling circuit, respective program counter start values for each thread of the plurality of threads;
based on a priority of a particular thread of the plurality of threads and based on an availability of at least some of the plurality of data samples that are to be processed by the particular thread, scheduling, by the hardware scheduling circuit, the particular thread for execution and transfer a program counter start value for the particular thread to an execution unit circuit;

executing, by the execution unit circuit, the particular thread to process the at least some of the plurality of data samples; and in response to determining, during a particular clock cycle, that a portion of the plurality of data samples are available to be processed by a different thread of the plurality of threads that has a higher priority than the particular thread:

saving a current value of the program counter for the particular thread; and transferring a program counter start value for the different thread to the execution unit circuit to permit the different thread to begin execution in a next clock cycle.

9. The method of claim 8, further comprising, causing, by the hardware scheduling circuit, in response to saving the current value of the program counter for the particular thread, the execution unit circuit to pause execution of the particular thread.

10. The method of claim 9, further comprising causing, by the hardware scheduling circuit, the execution unit circuit to resume execution of the particular thread in response to determining that execution of the different thread has halted.

11. The method of claim 8, wherein determining that the portion of the plurality of data samples is available to be processed by the different thread includes:

storing, by the execution unit circuit, output data samples in a buffer circuit, wherein the output data samples are generated as a result of the execution unit circuit executing the particular thread; and causing, by the hardware scheduling circuit, the execution unit circuit to pause execution of the particular thread in response to determining that the buffer circuit is storing at least a particular number of data samples generated from the execution of the particular thread.

12. The method of claim 11, further comprising, retrieving, by the execution unit circuit, at least some of the output data samples from the buffer circuit in response to beginning execution of the different thread by the execution unit circuit.

13. The method of claim 8, wherein the priority indications for the plurality of threads includes a primary priority and a secondary priority for each thread of the plurality of threads, and further comprising, causing, by the hardware scheduling circuit, the execution unit circuit to pause execution of the particular thread in response to determining that the different thread has a higher primary priority than the particular thread.

14. The method of claim 13, further comprising:

determining that one or more of the plurality of data samples are available to be processed by a third thread of the plurality of threads, the third thread having a same primary priority and higher secondary priority than the particular thread; and in response to determining that the different thread has halted, resume processing of the particular thread.

15. A non-transitory computer-readable storage medium having stored thereon design information that specifies a design of at least a portion of a hardware integrated circuit in a format recognized by a semiconductor fabrication system that is configured to use the design information to produce the hardware integrated circuit according to the design, wherein the design information specifies that the hardware integrated circuit comprises:

an execution unit circuit configured to process a plurality of data samples associated with a signal; and a hardware scheduling circuit configured to:

receive priority indications for a plurality of threads for processing the plurality of data samples;

store respective program counter start values for each thread of the plurality of threads;

based on a priority of a particular thread and based on an availability of at least some of the plurality of data samples that are to be processed by the particular thread, schedule the particular thread for execution and transfer a program counter start value for the particular thread to the execution unit circuit; and in response to a determination, during a particular clock cycle, that a portion of the plurality of data samples are available to be processed by a different thread of the plurality of threads that has a higher priority than the particular thread:

save a current value of the program counter for the particular thread; and transfer a program counter start value for the different thread to the execution unit circuit to permit the different thread to begin execution in a next clock cycle.

16. The non-transitory computer-readable storage medium of claim 15, wherein the hardware scheduling circuit is further configured to, in response to saving the current value of the program counter for the particular thread, cause the execution unit circuit to pause execution of the particular thread.

17. The non-transitory computer-readable storage medium of claim 16, wherein the hardware scheduling circuit is further configured to, in response to a determination that execution of the different thread has halted, cause the execution unit circuit to resume execution of the particular thread.

18. The non-transitory computer-readable storage medium of claim 16, wherein the execution unit circuit includes a buffer circuit configured to store output data samples generated as a result of executing the particular thread, and wherein the hardware scheduling circuit is further configured to, in response to an indication that the buffer circuit is storing at least a particular number of data samples generated from the execution of the particular thread, cause the execution unit circuit to pause execution of the particular thread and begin execution of the different thread.

19. The non-transitory computer-readable storage medium of claim 18, wherein the execution unit circuit is further configured to, in response to beginning execution of the different thread, retrieve, from the buffer circuit, at least some of the data samples generated from an execution of the particular thread.

20. The non-transitory computer-readable storage medium of claim 16, wherein the priority indications for the plurality of threads includes a primary priority and a secondary priority for each thread, and wherein the hardware scheduling circuit is further configured to, cause the execution unit circuit to pause execution of the particular thread in response to a determination that the different thread has a higher primary priority than the particular thread.

* * * * *